US009658098B2

(12) United States Patent
Peters et al.

(10) Patent No.: US 9,658,098 B2
(45) Date of Patent: May 23, 2017

(54) APPARATUS FOR WEIGHING SLAUGHTERHOUSE PRODUCTS AND METHOD FOR USING THE SAME

(71) Applicant: Marel Stork Poultry Processing B.V., Boxmeer (NL)

(72) Inventors: Erik Hendrikus Werner Peters, Boxmeer (NL); Tim Sander Rijerse, Gemert (NL); Gerardus Josef Gertrudis Reintjes, Leunen (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 65 days.

(21) Appl. No.: 14/384,582

(22) PCT Filed: Apr. 10, 2013

(86) PCT No.: PCT/NL2013/050262
§ 371 (c)(1),
(2) Date: Sep. 11, 2014

(87) PCT Pub. No.: WO2013/154427
PCT Pub. Date: Oct. 17, 2013

(65) Prior Publication Data
US 2015/0060153 A1 Mar. 5, 2015

(30) Foreign Application Priority Data
Apr. 13, 2012 (NL) ...................................... 2008635

(51) Int. Cl.
*G01G 19/06* (2006.01)
*G01G 17/08* (2006.01)
(Continued)

(52) U.S. Cl.
CPC ............... *G01G 19/06* (2013.01); *A22B 5/00* (2013.01); *A22B 5/0064* (2013.01);
(Continued)

(58) Field of Classification Search
CPC ........ G01G 17/08; G01G 19/04; G01G 21/08; G01G 21/23; G01G 11/04; G01G 23/14;
(Continued)

(56) References Cited

U.S. PATENT DOCUMENTS 2,815,480 A * 12/1957 Ruge .................... G01G 3/1406
177/145
3,108,648 A * 10/1963 Williams, Jr. ......... G01G 19/06
177/12
(Continued)

FOREIGN PATENT DOCUMENTS

EP         165231 A2 * 12/1985 ............... F16H 1/28
GB        2125174      2/1984

OTHER PUBLICATIONS

International Search Report and Written Opinion, PCT/NL2013/050262, mailed Jun. 10, 2013.

*Primary Examiner* — Randy Gibson
(74) *Attorney, Agent, or Firm* — Casimir Jones, SC

(57) ABSTRACT

The invention provides a device for weighing slaughter products. The device comprises conveying means for conveying the slaughter products, the conveying means comprising a frame, two pulley means which are connected to the frame a fixed distance apart, being rotatable about two respective first vertical axes of rotation, an endless flexible conveying element which is passed over the two pulley means, which conveying element extends along a rectilinear weighing path between the two pulley means, a guide extending along a conveying path, hooks for the slaughter products, which hooks are connected to the conveying element at regular intervals and which are each provided with a guide elements for guiding cooperation with the guide. The device further comprises weighing means for weighing slaughter products that are present within the weighing section and reducing means for reducing tensile (Continued)

stress in the conveying element insofar as it extends in the weighing section, said reducing means comprising transmission means that are operative between the two pulley means. The transmission means comprise a gear transmission with at least two meshing gears which are rotatable about respective second vertical axes of rotation, wherein the second axis of rotation of one of the at least two gears is in line with a first vertical axis of rotation, and wherein the second axis of rotation of another of the at least two gears is in line with the other first vertical axis of rotation.

27 Claims, 6 Drawing Sheets

(51) Int. Cl.
G01G 19/14 (2006.01)
A22B 5/00 (2006.01)
A22C 21/00 (2006.01)
F16H 55/00 (2006.01)
F16H 55/30 (2006.01)
G01G 11/04 (2006.01)
G01G 21/08 (2006.01)
G01G 19/03 (2006.01)

(52) U.S. Cl.
CPC ....... *A22C 21/0053* (2013.01); *F16H 55/303* (2013.01); *G01G 11/04* (2013.01); *G01G 17/08* (2013.01); *G01G 19/03* (2013.01); *G01G 19/14* (2013.01); *G01G 21/08* (2013.01)

(58) Field of Classification Search
CPC ...... G01G 19/06; G01G 19/03; G01G 19/035; G01G 19/14; B07C 5/18; B07C 5/32; A22C 21/0053; A22B 5/00; A22B 5/0064; F16H 55/303
See application file for complete search history.

(56) References Cited

U.S. PATENT DOCUMENTS

| | | | | |
|---|---|---|---|---|
| 3,894,592 A * | 7/1975 | Andersson | ............ | G01G 19/18 177/163 |
| 4,024,053 A * | 5/1977 | Drew, Jr. | .................. | B07C 5/32 177/21 OR |
| 4,040,592 A * | 8/1977 | Jones | ..................... | A47B 17/02 248/454 |
| 4,062,414 A * | 12/1977 | Cook | ..................... | G01G 19/06 104/172.4 |
| 4,282,633 A | 8/1981 | Graham | | |
| 4,363,369 A * | 12/1982 | Susor | .................... | G01G 3/1402 177/145 |
| 4,393,950 A * | 7/1983 | Klopfenstein | ..... | G01G 13/2958 177/108 |
| 4,593,778 A * | 6/1986 | Konishi | .................. | G01G 23/06 177/185 |
| 4,709,770 A * | 12/1987 | Kohashi | ............... | G01G 3/1414 177/185 |
| 4,711,344 A * | 12/1987 | Altenpohl | .............. | G01G 11/00 177/163 |
| 4,754,822 A * | 7/1988 | Altenpohl | ............ | G01G 11/046 177/145 |
| 4,841,789 A * | 6/1989 | Ochiai | ...................... | F01L 1/02 123/90.31 |
| 5,037,351 A * | 8/1991 | Van Den Nieuwelaar | ................ | A22C 21/0053 177/145 |
| 5,088,569 A * | 2/1992 | Checcucci | ........... | G01G 11/003 177/145 |
| 5,156,224 A * | 10/1992 | Leifeld | ................... | G01G 17/02 177/255 |
| 5,440,077 A * | 8/1995 | Konishi | ................. | G01G 23/10 177/185 |
| 5,789,713 A * | 8/1998 | Wakasa | ................... | G01G 23/10 177/185 |
| 5,856,637 A * | 1/1999 | Vande Berg | ........... | G01G 19/18 177/145 |
| 6,689,963 B2 * | 2/2004 | Brook | .................... | G01G 19/14 177/145 |
| 8,038,428 B2 * | 10/2011 | Tashiro | ................. | B29C 70/504 425/182 |
| 2008/0271556 A1 * | 11/2008 | Imamura | ........... | F16H 57/02004 74/412 R |
| 2014/0356027 A1 * | 12/2014 | Yamazaki | ................ | F16H 1/20 399/167 |

* cited by examiner

APPARATUS FOR WEIGHING SLAUGHTERHOUSE PRODUCTS AND METHOD FOR USING THE SAME

CROSS-REFERENCE TO RELATED APPLICATIONS

This application is a U.S. 371 national phase entry of pending International Patent Application No. PCT/NL2013/050262, international filing date Apr. 10, 2013, which claims priority to Dutch Patent Application No. NL2008635, filed Apr. 13, 2012, the contents of which are incorporated by reference in their entireties.

DESCRIPTION

The present invention relates to a device for weighing slaughter products, comprising conveying means for conveying the slaughter products, the conveying means comprising a frame, two pulley means which are connected to the frame a fixed distance apart, being rotatable about two respective first vertical axes of rotation, an endless flexible conveying element which is passed over the two pulley means, which conveying element extends along a rectilinear weighing path between the two pulley means, a guide extending along a conveying path, hooks for the slaughter products, which hooks are connected to the conveying element at regular intervals and which are each provided with a guide elements for guiding cooperation with the guide, weighing means for weighing slaughter products that are present within the weighing section, reducing means for reducing tensile stress in the conveying element insofar as it extends in the weighing section, said reducing means comprising transmission means that are operative between the two pulley means.

During the slaughtering process it is advantageous to have reliable and precise information at one's disposal regarding the weight of individual slaughter products, such as a pig, turkey or chicken for slaughter or parts thereof. Said information can be utilised, for example, for optimally carrying out the slaughtering process. Thus, slaughtering machines can be optimally adjusted on the basis of the weight of the slaughter products, so that a high degree of efficiency can be achieved and the operation of a cooling tunnel can be geared to the weight of the slaughter products present in the cooling tunnel, so that the efficiency regarding loss of weight can be kept at a constant value. Other reasons for weighing slaughter products during the slaughtering process may for example include settlement with suppliers and/or customers or logistic planning.

A device as described in the introduction is known from GB 2 125 174 A. The device described therein comprises, inter alia, a chain that is passed over a quarter of two toothed wheels. Between the toothed wheels, a transmission is provided, which transmission comprises a coaxial pulley for each of the toothed wheels and an endless belt that is passed over the pulleys. Carriers 2, which extend along a guide provided above the chain, are connected to the chain at regular intervals. Because of the operation of the aforesaid transmission, the tensile stress in the chain between the toothed wheels is reduced, making it possible to weigh poultry suspended from the carriers without the tensile stress in the chain interfering with the weighing process.

A drawback of the above-described weighing device is the fact that the tensile stress in the transmission belt leads to elongation in practice, as a result of which the two pulleys will no longer run in the phase that is desirable for reducing the tensile stress, as a consequence of which the toothed wheels will no longer run in the desired phase, either and tensile stress may develop in the chain yet in the section between the toothed wheels, which tensile stress will make it more difficult to weigh poultry or in any case will render the weighing result less accurate. These drawbacks may be part of the reason why the weighing of slaughter products being conveyed through a slaughterhouse, suspended from hooks or the like, by means of a conveying system does not take place with the device described above. In practice it is rather more usual to transfer the slaughter products from a first processing line to a second processing line by means of transfer devices, which second processing line is especially arranged for weighing the slaughter products in question, such as poultry. The use of a transfer device leads to additional cost, however.

The object of the present invention is to provide a device by means of which in-line slaughter products can be accurately measured, also at high line speeds, without having to transfer the products or to adjust the weighing device on a regular basis. In order to achieve that object, the present invention provides a weighing device as described in the introduction, in which the transmission means comprise a gear transmission with at least two meshing gears which are rotatable about respective second vertical axes of rotation, wherein the second axis of rotation of one of the at least two gears is in line with a first vertical axis of rotation, and wherein the second axis of rotation of another of the at least two gears is in line with the other first vertical axis of rotation. The use of the at least two meshing gears makes it possible to eliminate the tensile stress in the conveying element, for example a chain, as a result of which it is possible to determine the weight of slaughter products also at high processing rates of up to 18,000 slaughter products per hour, whilst the cost price of the weighing device according to the invention as well as the operating expenses (cost of ownership) are relatively low. In addition, the device for weighing slaughter products is suitable for being used in a universal manner, without special requirements being made of the slaughter line in which the device according to the invention is to function. It is quite possible, therefore, to integrate the weighing device according to the invention in an existing slaughterhouse. Furthermore, the weighing device according to the invention can be of relatively simple design, which will lead to a relatively low cost price and possibly a relatively limited use of space.

In order to reduce the necessary diameter of the gears or in order not to be bound by a fixed length of the weighing section, given a specific diameter of the gears, it is preferable if the gear transmission comprises at least three, more preferably four, successive gears, wherein the second axes of rotation of the outer gears are aligned with the respective first axes of rotation.

In order to reduce disturbances in the weighing process of slaughter products as much as possible it may furthermore be advantageous if the teeth of gears of the gear transmission have an oblique orientation, as a result of which the meshing of the teeth of meshing gears does not take place instantaneously but gradually, so that the risk of vibrations caused by meshing teeth is limited, or such vibrations are at least so small that they do not interfere with the weighing measurements.

Within the aforesaid framework it may furthermore be advantageous if gears of the gear transmission are provided in pairs, wherein the gears of a pair of gears have a common second axis of rotation, wherein furthermore preferably the teeth of gears of a pair of gears are oriented mirror-symmetrically relative to a plane of symmetry that extends perpendicularly to the common axis of rotation. The mirror-symmetrical orientation of the teeth contributes to the elimination or at least reduction of axial forces that might increase the load on the bearings.

Preferably, the gears of a pair of gears are directly rigidly connected. The stiffness of the transmission is thus further increased. The direct connection can be effected, for example, by bolting the gears together. Also the embodiment in which the gears of a pair of gears are configured as one integral, for example machined, part is to be considered to be included in the present preferred embodiment.

A very advantageous embodiment is characterised in that the teeth of the gears of a pair of gears have the same pitch, with the teeth of the gears of a pair of gears are staggered over a half-pitch distance relative to each other. The fact that the teeth in question are staggered over a half-pitch distance further contributes toward an optimally gradual meshing of teeth of meshing gears, and also toward increasing the disturbance frequency, so that in practice said disturbance frequency will further deviate from the natural frequency of the weighing device, which ranges between 10 Hz and 30 Hz, for example.

The risk of the occurrence of vibrations that may interfere with the weighing measurements can be further reduced if the device is supported in a suspended position rather than a standing position. The device is to that end preferably provided with tie rods for suspending the frame. The device may for example be suspended from the roof construction of the space in which the weighing device is disposed. Another advantage that is achieved by suspending the device by the frame is the limited floor area that is thus taken up by the device.

A constructionally advantageous embodiment is obtained if the weighing means comprise a vertically movable weighing part of the guide, as well as a weighing unit for determining the weight load to which the weighing part is subjected.

In order to have a possibility of compensating for vibrations that cause interference, the weighing part is preferably provided with a vibration sensor for measuring external vibrations acting on the weighing part. The term "external vibrations" is understood to mean those vibrations that have their origin in the environment of the weighing device.

The vibration sensor preferably comprises a further weighing unit, so that the nature of the signals from the vibration sensor and those from the weighing unit will be the same.

The risk of the occurrence of vibrations that may interfere with the weighing measurements can also be reduced if the frame is provided with two girders, via the two ends of which the frame is connected to the environment, wherein the girders have a higher bending stiffness in horizontal direction than in vertical direction, more in particular if the bending stiffness of the girders in horizontal direction is at least two times, more preferably at least five times, higher than the bending stiffness of the girders in vertical direction. Vibrations which are transmitted to the weighing device from the environment of the weighing device, for example via the floor or the roof, will thus in particular lead to vibrations in vertical direction in the weighing device itself. Said vibrations are relatively easy to compensate, as will be discussed yet hereinafter.

The girders are preferably oriented transversely to the connecting line between the axes of rotation of the pulleys, wherein the girders furthermore preferably intersect the axes of rotation.

If, according to another preferred embodiment, the weighing means comprise a start sensor for detecting the arrival of a hook on the weighing part, the arrival of a hook on the weighing part can be precisely left out of consideration during the weighing measurement. After all, the arrival of a hook does not provide a representative image of the weight of the slaughter product.

A similar consideration applies when a hook moves off the weighing part again. In order to make it possible to leave the phase during which the hook moves off the weighing part out of consideration as well, the weighing means may comprise an end sensor for detecting a hook on the weighing part downstream of the start sensor. Alternatively it is also possible to have a weighing measurement take place during a particular time interval after the hook has arrived on the weighing part as detected by a start sensor, wherein the time interval is selected so that it ends before the phase during which the hook moves off the weighing part begins. The time interval in question might also be dependent on the speed at which the hook moves over the weighing part.

The precision of the weighing measurements of the slaughter products can be further increased if the weighing means comprise a file with the tare weight of each of the hooks acting on the weighing part during passage of the respective hooks without a slaughter product being suspended therefrom. Although this is an obvious assumption, the tare weight of the hooks need not be the same for every hook in spite of the fact that the hooks are identical.

Within this framework the invention also relates to a method for using the device according to the preceding embodiment, which method comprises the steps of
  determining the gross weight acting on the weighing part
    with the aid of the weighing means while a hook from
    which a slaughter product is suspended moves along
    the weighing part,
  deducting the tare weight associated with the hook as
    stored in the file from the gross weight so as to obtain
    the net weight of the slaughter product.

By making use of the present preferred embodiment of the device of the present invention and also of the method according to the invention, differences in the tare weight of various successive hooks can be compensated for. After all, such differences involve the risk of being incorrectly interpreted as differences in the weight of the slaughter products.

The characteristic aspects of the present preferred embodiment of the device according to the invention and also of the methods according to the invention can also quite well be used in devices and methods according to the prior art, as can be considered to be known from the aforesaid publication GB 2 125 174 A.

Due to ambient factors, such as temperature fluctuations or the presence of impurities on the weighing part, for example, there is a risk of weighing errors being structurally made. To reduce this risk, the method according to the invention preferably comprises the steps of
  determining the tare weight of a number of empty hooks
    with the aid of the weighing means
  comparing the tare weights as determined with the tare
    weights of the hooks in question as stored in the file,
    and
  if it appears from said comparison that a similar difference
    occurs between the tare weights as determined and the
    tare weights as stored in the file, correcting the tare
    weights as stored in the file in accordance with said
    similar difference.

The similar difference indicates a structural weighing error. This error can be compensated by correcting the tare weights as stored in the file in accordance with the similar difference. The above first step can take place continuously during production as in practice not all the hooks will carry a slaughter product. Alternatively it is also possible, of course, to carry out the above first step prior to starting the production, for example for all the hooks of a slaughter line and that a number of times, for example.

A comparable risk of an incorrect weighing measurement exists if impurities deposit on a specific individual hook. The weight of such impurities will normally be considered (incorrectly so) to be the weight of the slaughter product. A correction in this regard can be obtained if the method according to the invention comprises the steps of determining the tare weight of an empty hook a number of times with the aid of the weighing means, determining the average of the tare weights as determined, comparing the average tale weight as determined with the tare weight for the book in question as stored in the file, and if it appears from the comparison that a difference occurs between the average tare weight as determined and the tare weight as stored in the file, correcting the tare weight stored in the file in accordance with said difference.

The above first step, too, can be carried out during production and also before production is started.

Returning to the weighing device according to the invention, it is advantageous if the conveying element comprises a link chain with vertically oriented links and horizontally oriented links interconnected in a regular pattern, and at least one pulley means is circumferentially provided with teeth arranged in pairs, each pair comprising an upper tooth and a lower tooth disposed directly opposite each other, wherein a gap is present between the teeth of a pair of teeth, into which gap horizontally oriented links extend at least partially, and wherein vertically oriented links are provided between the four teeth associated with two adjacent pairs of teeth, which links circumferentially abut against the flanks of said four teeth. Thus it is possible to have the conveying element and a pulley cooperate in a reliable manner.

In order to contribute to a reliable entry of the link chain on a pulley it is advantageous if the teeth are conical in shape, seen in top plan view, and/or in particular if the upper teeth have the shape of a downward-facing cone, preferably a truncated cone, seen in vertical cross-sectional view, and/or if the lower teeth have the shape of an upward-facing cone, preferably a truncated cone, seen in cross-sectional view. Thus it is possible to realise a very stable abutment of the vertically oriented links against the flanks of the teeth, also if the link chain is subject to some wear.

Also conducive to a reliable entry of the link chain is an arrangement wherein the conveying element comprises a link chain with vertically oriented links and horizontally oriented links interconnected in a regular pattern, and wherein at least the most downstream pulley means is circumferentially provided with teeth, wherein the conveying means comprise a guide on the circumference of the most downstream pulley means for pushing the link chain in the direction of the teeth. The entry of the link chain on the most downstream pulley means is the most critical, because it is at that location where the link chain is slack in the weighing device according to the invention.

It may furthermore be advantageous if, whether or not in combination with previously discussed preferred embodiments, the conveying element comprises a link chain with vertically oriented links and horizontally oriented links interconnected in a regular pattern, and at least the most downstream pulley means is circumferentially provided with teeth and, between adjacent teeth, at the bottom side thereof, with guide surfaces for guiding vertically oriented links of the link chain radially inward. The vertical links can thus slide over the guide surfaces upon entry of the links in question.

In particular in the case of a slack link chain it is additionally advantageous if the guide surfaces are inclined in radially inward direction. Said inclination may be limited, for example to less than 20 degrees. Thus the correct height is imparted to the link chain in a simple manner while the link chain slides inward over the guide surfaces.

The previously discussed preferred embodiments comprising a link chain and at least one pulley means circumferentially provided with teeth can be used not only in weighing devices according to the invention but generally also in conveying means for conveying slaughter products. In that case there is provided a conveying system for conveying slaughter products, comprising conveying means comprising a frame, at least one pulley means which is rotatably connected to the frame about a vertical axis of rotation, an endless flexible conveying element which is passed over said at least one pulley means, a guide extending along a conveying path, hooks for the slaughter products, which hooks are connected to the conveying element at regular intervals and which are each provided with guide means for guiding cooperation with the guide.

The invention will now be explained in more detail by means of a description of a preferred embodiment of the invention, in which reference is made to the following figures.

Figures 1, 2, 3:
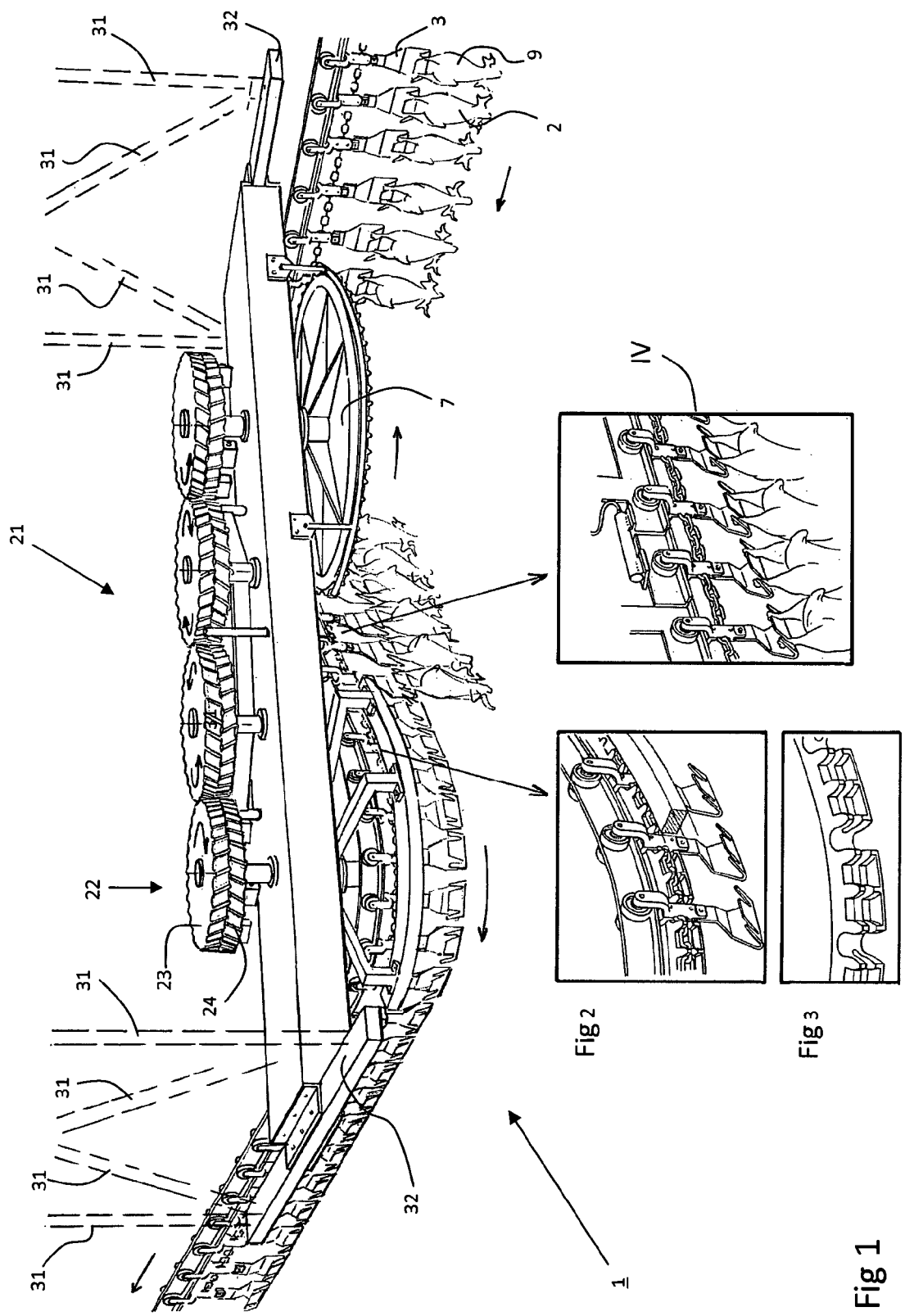
FIG. 1 is a schematic, perspective view of a weighing device according to the invention, including the vicinity thereof.
FIGS. 2, 3 are more detailed views of the areas indicated in FIG. 1 for the figures in question.
Figure 2:
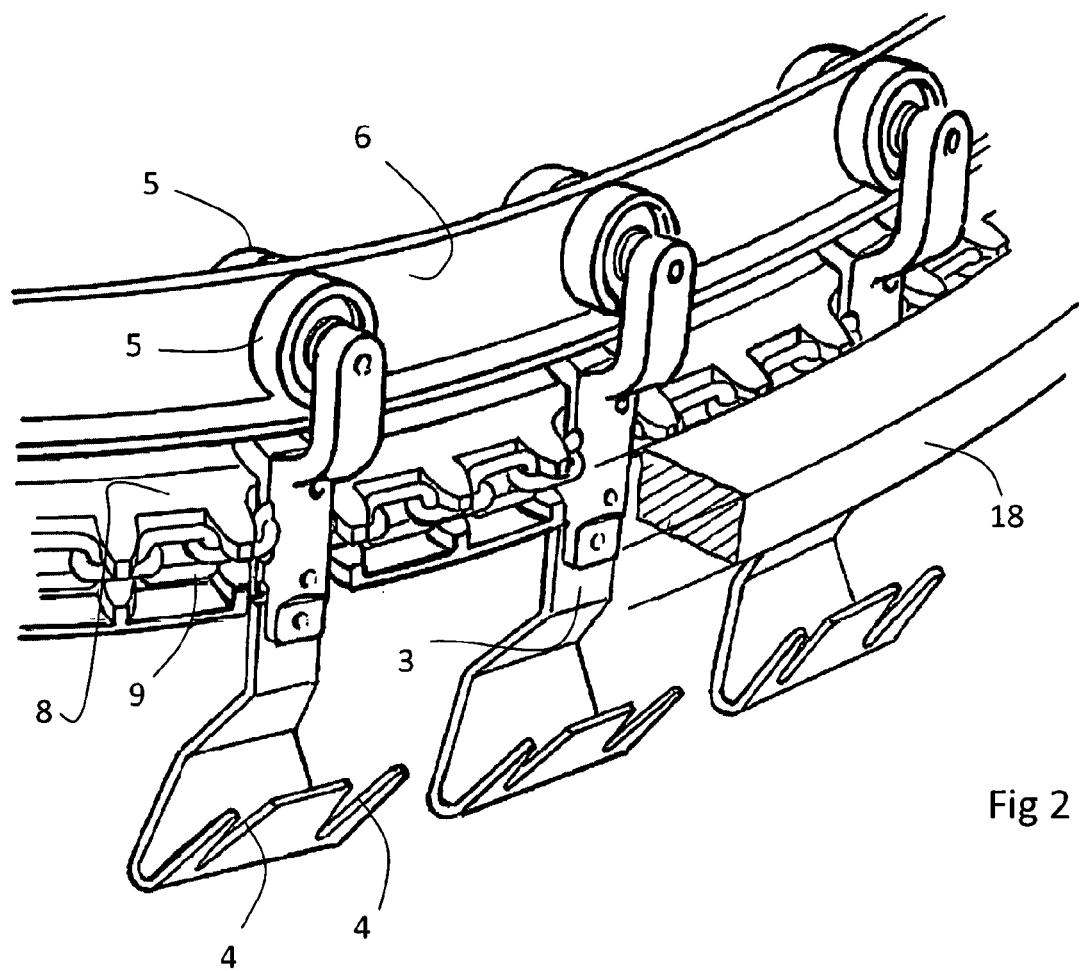
Figure 3:
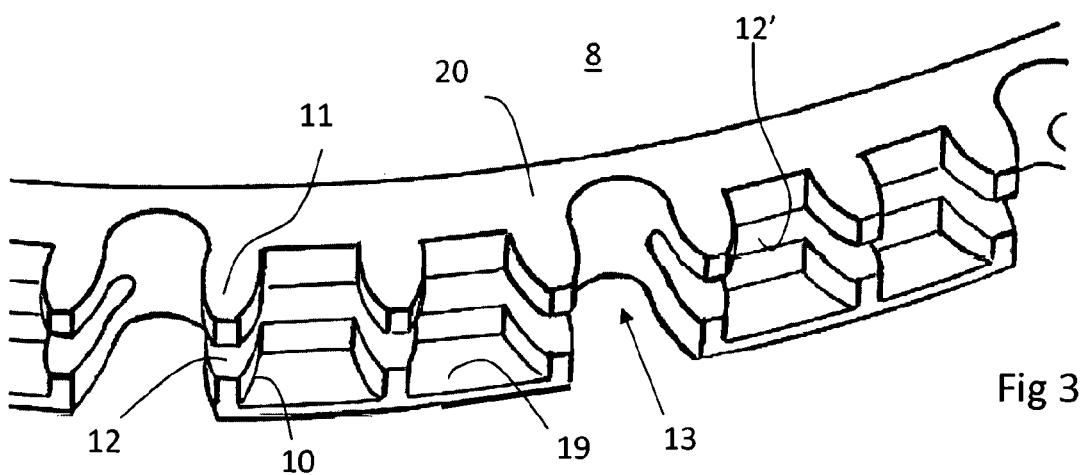

FIG. 1 shows a weighing device 1 for weighing individual birds 2 for slaughter. The weighing device 1 forms part of a conveying system. The conveying system comprises transport hooks 3 (see also FIG. 2), which are each designed for suspending an individual bird 2 for slaughter therefrom with its legs in slots 4 at the bottom side thereof. At the upper side, each transport hook 3 is provided with two guide means configured as running wheels 5. The conveying system further comprises a guide 6, which is configured as an upside-down T-shaped section, with the running wheels 5 running over the upper sides of the parts of the upside-down T-shape that are located on either side of the web portion of the upside-down T-shape. The endless configuration of the guide 6 determines the conveying path for the slaughter birds 2 and comprises, inter alia, two bends of opposite sense of about 135°, which are concentric with two pulleys 7, 8 yet to be discussed in more detail. The pulleys 7, 8 are rotatable about vertical axes of rotation relative to the frame.

Figure 6:
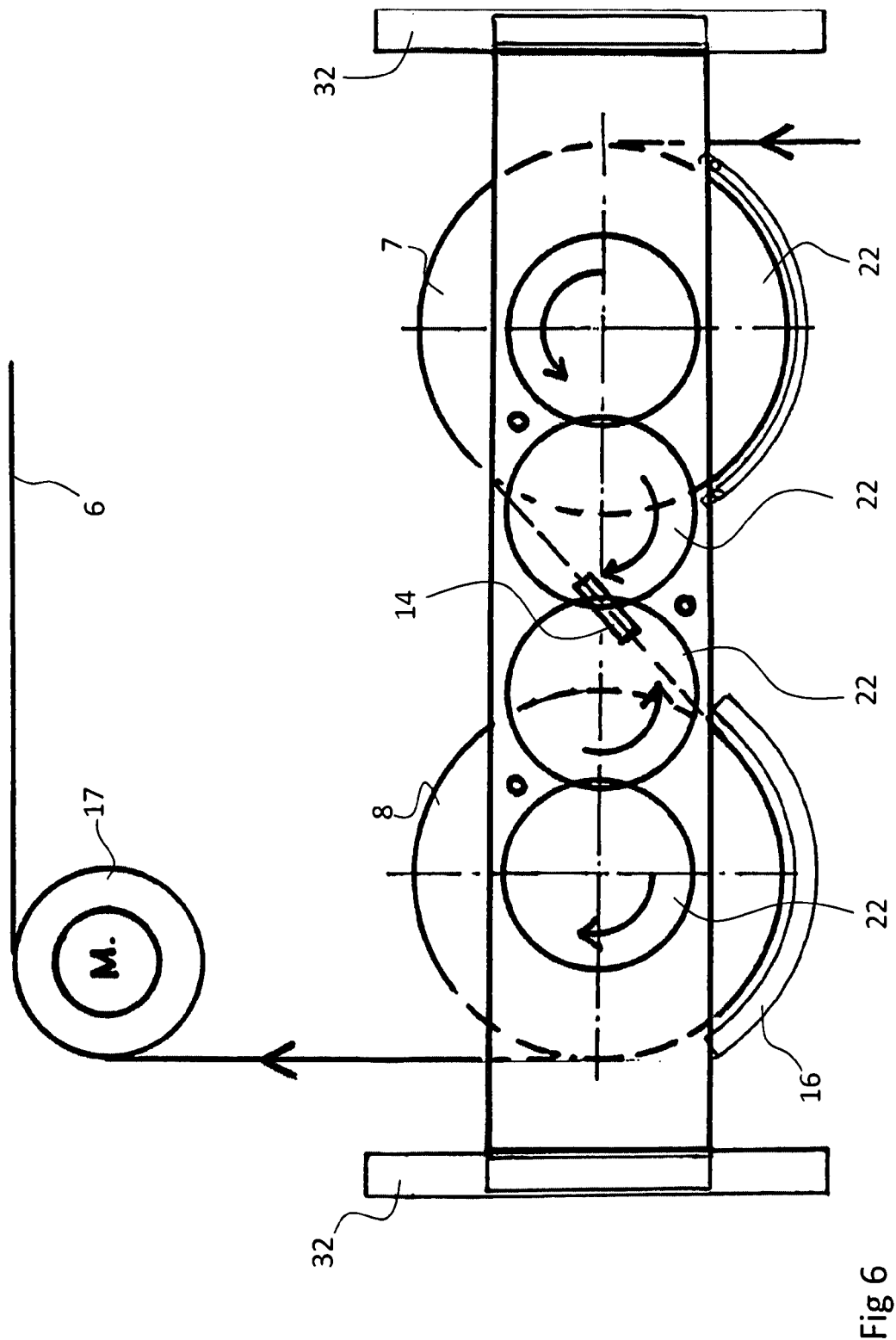
FIG. 6 is a schematic top plan view of the weighing device of FIG. 1.

The transport hooks 3 are coupled together at regular intervals via a link chain 9. The chain 9 is driven via a drive pulley 17 (FIG. 6). The pulleys 7, 8 are circumferentially provided with two layers of teeth 10, 11, with a gap 12 present therebetween. The gap 12 continues into a web portion 20, from where teeth 10, 11 extend outward. In the web portion 20, the gap is indicated at 12'. Recesses 13 are furthermore provided on the circumference of the pulleys 7, 8 between respective sets of three pairs of teeth 10, 11. The vertical position of the pulleys 7, 8 has been selected so that it is identical to the vertical position of the chain 9. The chain 9 is passed over (135°) of the pulleys 7, 8, the horizontal links of the chain 9 being positioned centrally in the gap 12 and the vertical links being accommodated between adjacent pairs of teeth 10, 11. The teeth 10, 11 are conical in shape, as a result of which the vertical links of the chain 9 abut against the conical flanks of the teeth 10, 11. The transport hooks 3 extend partially within the recesses 13.

Figure 7:
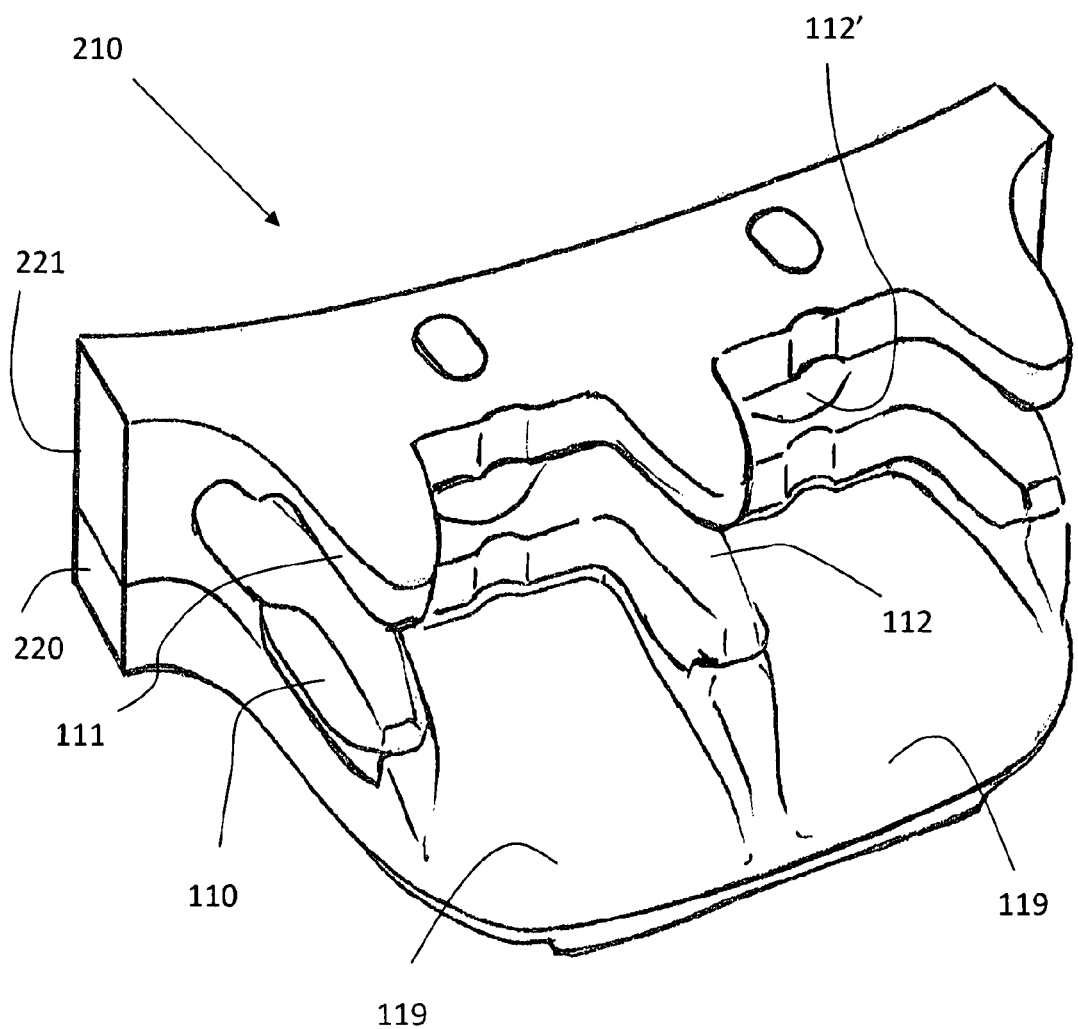
FIG. 7 is a more detailed view of teeth of the pulley shown in FIGS. 2 and 3.

To ensure that the chain 9, which is tensionless at the location where it enters the pulley, as will become apparent hereinafter, enters the pulley 8 in a reliable manner, a concentric guide strip 18 is provided on the outer side of the pulley 8, which guide strip brings the links of the chain 9 into engagement with the pulley 8 in the correct manner, i.e. in the manner described above. Furthermore, in order to ensure a reliable entry of the chain between adjacent lower teeth 10, with the exception of those positions where a recess 13 is provided, a guide surface configured as a flap 19 is provided at the bottom side of said lower teeth, on which the chain 9, more specifically the vertically oriented links thereof, can rest. With the aid of the guide 18 the chain 9, more specifically the vertically oriented links thereof, is swept over the flaps 19 between the teeth 10, 11 as it were. In the variant shown in FIG. 7, the flaps 119 to that end have a slightly inclined orientation, the flaps 119 being positioned slightly lower on the outer side than on the inner side. FIG. 7 shows a segment 210 as may be provided along the entire circumference of a pulley. The segment 210 is built up of a lower segment part 220, of which the flats 119 form part, and an upper segment part 221 fixedly connected to the lower segment part 220, of which the teeth 110, 111 form part. The lower teeth 110 have the form of a truncated, upward-facing cone, seen in vertical cross-sectional view, whilst the upper teeth 111 have the form of a truncated, downward-facing cone. The flanks of the teeth 110, 111 are inclined, therefore. In addition to that, the teeth 110, 111, just like the teeth 10, 11 for that matter, are conical in shape, seen in top plan view. Because of this configuration the vertically oriented links of the chain 9 can reliably abut, at four points, against facing flanks of two adjacent pairs of teeth 110, 111, also if the chain 9 is subject to wear.

Figure 4:
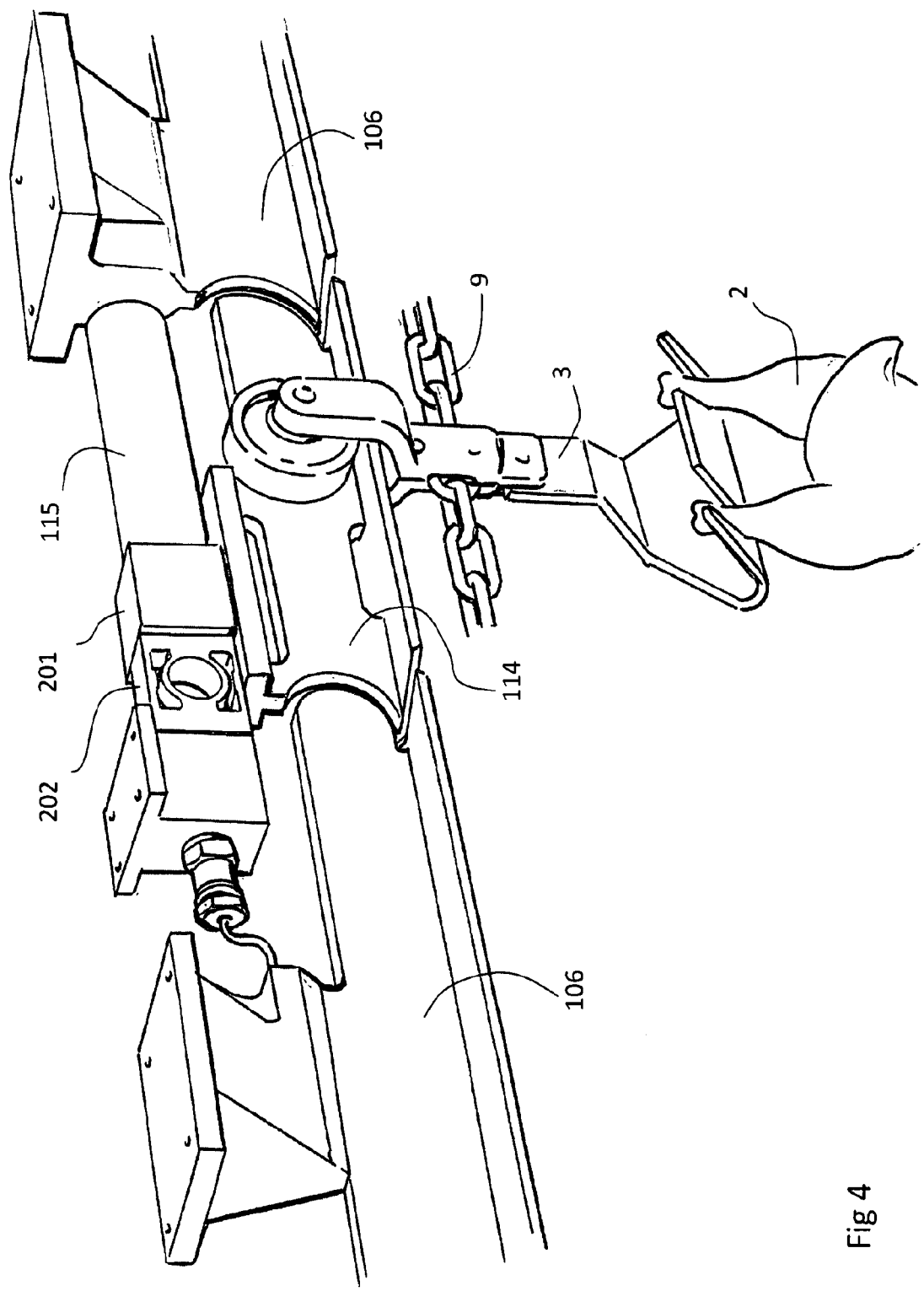
FIG. 4 shows an alternative embodiment of the area IV in FIG. 1.
Figure 5:
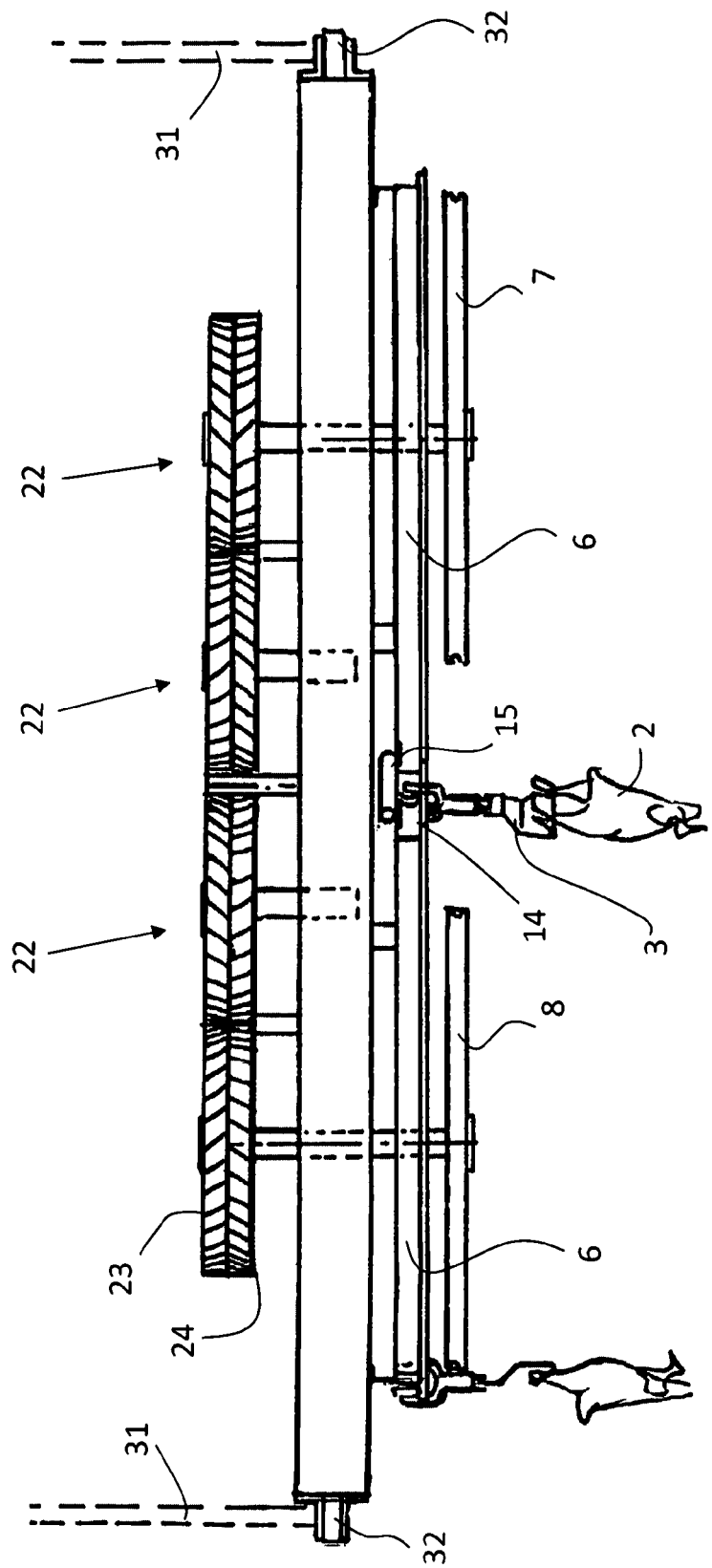
FIG. 5 is a side view of a part of the weighing device of FIG. 1.

The conveying path between the pulleys 7, 8 is rectilinear, as is clearly shown in particular in FIG. 6. Said rectilinear part of the conveying path will be referred to as "weighing section" hereinafter. Within the weighing section, the weighing device 1 is designed for weighing individual slaughter birds 2. The guide 6 is to that end locally interrupted, as is shown in FIG. 4. At the location of said interruption the guide is formed by a weighing part 14, which is in fact made up of a relatively short, upside-down T-shaped section element which is in line with the upside-down T-shaped section of the guide 6. The weighing part 14 is connected to an adjacent part of the guide 6, in this case to the upstream part of the guide 6, via a weighing unit 15. By means of the weighing unit 15 it is possible to determine the weight, or at least a measure thereof, of the slaughter hook 3, whose running wheels 5 are present on the weighing part 14, including the weight of the slaughter bird 2 that may be suspended from the hook 3 in question and including the weight of part of the chain 9.

The object of the measurement by means of the weighing unit 15 is to be able to determine the weight of individual slaughter birds 2. As is shown in particular in FIG. 4, the weighing unit 15 measures a gross weight rather than the net weight of the slaughter bird 2. The tare weight, being the difference between the gross weight and the net weight, concerns the weight of the weighing part 14, the hook 3 and part of the chain 9. In the present invention, the weighing device 1 is provided with means for reducing the tensile stress in the chain 9. The means for reducing the tensile stress in the chain 9 comprise a gear transmission 21, which will be discussed in the next paragraph. As shown in FIG. 4, the chain 9 slightly sags between the hooks 3 and is tensionless on account of the action of the aforesaid means. If this were not the case, the weight of the hook 3 with the slaughter bird 2, and also of the chain 9, would not be carried, or at least only partially so, by the weighing part 4, and thus by the weighing unit 15, but rather by the pulleys 7, 8.

The gear transmission 21 comprises four pairs 22 of coaxial, rigidly interconnected gears 23, 24, which, like the pulleys 7, 8, are rotatable about vertical axes of rotation relative to the frame 16. The axes of rotation of the outer pairs 22 coincide with the axes of rotation of the respective pulleys 7, 8. Said outer pairs 22 are rigidly connected to the pulley 7, 8 located therebelow, so that they can only rotate jointly. The gears 23, 24 of adjacent pairs 22 engage each other, so that the four pairs 22 form the gear transmission 21 between the pulley 7 and the pulley 8. The gear transmission 21 in question is very rigid, which makes it possible, by suitable adjustment of the connection between the respective pulleys 7, 8 and the gear transmission 21, to keep the chain section between the pulleys 7, 8 tensionless.

The gears 23, 24 of each of the pairs 22 comprise teeth which have the same pitch and an oblique orientation, but which are oriented in opposite directions, such that the teeth of the upper gear 23 and the teeth of the lower gear 24 are oriented mirror-symmetrically relative to a plane perpendicular to the common axis of rotation, at the location of the boundary surface between the upper gear 23 and the lower gear 24. The teeth of the gear 23 and the teeth of the gear 24 are furthermore staggered over a half-pitch distance relative to each other. All the above measures regarding the teeth of the gears 23, 24 contribute to a vibration-free operation of the gear transmission 21. Because of the specific characteristics of the teeth, no instantaneous meshing of teeth of the gear transmission takes place, but said meshing is spread over time. The mirror-symmetrical orientation of the teeth prevents a vertical load being exerted on the bearings (not shown) that are provided for the gears 23, 24 to rotate. Because the teeth are staggered over a half-pitch distance, the disturbance frequency of the gear transmission 21 is doubled and the amplitude thereof is further reduced. The disturbance frequency is thus further removed from the natural frequency of the weighing device 1, which typically ranges between 10 Hz and 30 Hz, more specifically between 15 Hz and 20 Hz, so that the risk of resonation of the weighing device 1 due to external vibrations is further reduced.

Another measure that has been taken in order to prevent as much as possible the occurrence of vibrations that may interfere with the measurements carried out by the weighing unit 15 is to suspend the frame 16 from tie rods 31 via girders 32 connected to the frame 16. By suspending the weighing device 1 from a roof construction or the like of the space in which the weighing device 1 is used, rather than have it stand on the floor of a space in which the weighing device 1 is used, the floor area needed by the weighing device 1 is minimal. In addition to that, less vibrations, or at least less heavy vibrations or vibrations having a higher frequency, will usually be transmitted to the weighing unit 15. This achieves that vibrations which may be transmitted from the environment to the weighing unit 15 via the tie rods 31 will be damped in the horizontal plane and will in particular occur in vertical direction at the location of the weighing unit 15. It is more advantageous if the girders 32 intersect the axes of rotation of the pulleys 7 and 8 so as to prevent sagging of the frame 16 as much as possible. Alternatively it is also possible within the framework of the present invention for the weighing device to stand on the floor.

It has furthermore been decided to dimension the girder 32 so that the bending stiffness of the girders 32 in horizontal direction is at least two times, for example six times, higher than the bending stiffness of the girders in vertical direction. In the present example, the girders 32 are disposed at the ends of the frame 16, transversely to the longitudinal direction thereof. Such vibrations can be compensated by means of a vibration sensor provided on the weighing part, as will be explained in more detail hereinafter, so that they will not affect, or at least not adversely so, the measurements carried out by the weighing unit 15. Such a vibration sensor is indicated at 201 in FIG. 4. In the variant shown in FIG. 4, parts that correspond to parts of the weighing device 1 are indicated by corresponding numerals. Parts which are comparable to each other but not identical are indicated by a reference numeral augmented by 100. The weighing unit 115 is connected to the frame 116 (not shown) via a connecting piece 202. Provided on the weighing unit 115 is a vibration sensor 201 which is capable of detecting vibrations of the weighing cell 115. The connecting piece 202 is configured so that it has a relatively low bending stiffness in vertical direction and a relatively high bending stiffness in horizontal direction. Vibrations of the weighing unit 115 which are caused by external factors and which are transmitted to the weighing unit 115 via the frame 116 will mainly occur in vertical direction and be detected by the vibration sensor 201. Detections by the weighing unit 115 can be corrected with the detections from the vibration sensor 201. Such filtering is known per se to those skilled in the art and forms the subject matter of, for example, European patent application EP 2 202 498 A2. The vibration sensor 201 is preferably formed by a second weighing unit having a dead mass. Said vibration sensor registers the vibrations that the weighing part 114 experiences. The signal from the vibration sensor 201 can be deducted from the signal from the weighing unit 15 so as to obtain a more precise value for the gross weight of a slaughter bird 2.

The weighing device 1 is used as follows. Hooks 3 move over the weighing part 14 on their running wheels 5. As soon as the running wheels arrive on the weighing part, this is detected by a start sensor (not shown), such as an approach sensor, for example configured as a camera system. The start sensor delivers a starting signal to the weighing unit 15 to start the weighing measurement. Until the moment the hook 3 leaves the weighing part 14 again, the weighing unit 15 carries out weighing measurements with a certain sampling frequency, for example between 200 Hz and 800 Hz. The moment of leaving the weighing part 14 by the hook 3 can be determined by means of a separate end sensor, if desired, or for example on the basis of knowledge of the length of the weighing part 14 and the speed at which the hooks 3 are driven by the driving mechanism 17. The measurements are filtered and compensated on the basis of signals from the vibration sensor. Said filtered values, or at least some of said values, are averaged, the average being a measure of the gross weight. Possibly, the average weight is only determined over a middle part of the time interval over which the measurements have taken place so as to eliminate entry and exit phenomena.

In order to be able to determine the net weight on the basis of the gross weight, the tare weight of the individual 3 has been determined during a previous stage. To that end the hooks 3 have been weighed, preferably a number of times, by means of the weighing unit 15 without a slaughter bird 2 or the like being suspended therefrom, i.e. in unloaded condition, after which the (average) tare weight has been stored in a hook table for each individual hook, which to that end has a unique hook number or at least a (fictitious) indication. Upon determination of the weight of a slaughter hook 2, the tare weight of the hook in question is deducted from the gross weight as determined in the above-described manner.

There are several reasons why the tare weight can change over time. Thus it is conceivable, for example, for impurities such as offal or moisture to deposit on the hook 3, the chain 9 or the weighing part 14. Such changes may take place temporarily or gradually, for example due to temperature fluctuations. The aforesaid table can be kept up to date in practice by comparing the weight measured by the weighing unit 15 with the tare weight listed in the table each time an empty hook 3 passes the weighing part 14. In case of a, statistically relevant, difference the value listed in the table can be modified to the current tare weight value.

Furthermore it is also possible to make an analysis for a larger number of tare weights. If it becomes apparent that measured tare weights are structurally different for a larger number of hooks, for example because of drift of the weighing unit 15, the values for all the hooks in the table can be corrected according to the structural difference.

The invention claimed is:

1. A device for weighing slaughter products, comprising conveying means for conveying the slaughter products, the conveying means comprising a frame, two pulley means which are connected to the frame a fixed distance apart, being rotatable about two respective first vertical axes of rotation, an endless flexible conveying element which is passed over the two pulley means, which conveying element extends along a rectilinear weighing path between the two pulley means, a guide extending along a conveying path, hooks for the slaughter products, which hooks are connected to the conveying element at regular intervals and which are each provided with a guide elements for guiding cooperation with the guide, weighing means for weighing slaughter products that are present within the weighing section, reducing means for reducing tensile stress in the conveying element insofar as it extends in the weighing section, said reducing means comprising transmission means that are operative between the two pulley means, wherein the transmission means comprise a gear transmission with at least two meshing gears which are rotatable about respective second vertical axes of rotation, wherein the second axis of rotation of one of the at least two gears is in line with a first vertical axis of rotation, and wherein the second axis of rotation of another of the at least two gears is in line with the other first vertical axis of rotation.

2. A device according to claim 1, wherein the gear transmission comprises at least three successive gears, wherein the second axes of rotation of the outer gears are aligned with the respective first axes of rotation.

3. A device according to claim 1, wherein the teeth of gears of the gear transmission have an oblique orientation.

4. A device according to claim 1, wherein gears of the gear transmission are provided in pairs, wherein the gears of a pair of gears have a common second axis of rotation.

5. A device according to claim 3, wherein the teeth of gears of a pair of gears are oriented mirror-symmetrically relative to a plane of symmetry that extends perpendicularly to the common axis of rotation.

6. A device according to claim 4, wherein the gears of a pair of gears are rigidly connected.

7. A device according to claim 4, wherein the teeth of the gears of a pair of gears have the same pitch, with the teeth of the gears of a pair of gears are staggered over a half-pitch distance relative to each other.

8. A device according to claim 1, wherein the device is provided with tie rods for suspending the frame.

9. A device according to claim 1, wherein the weighing means comprise a vertically movable weighing part of the guide as well as a weighing unit for determining the weight load to which the weighing part is subjected.

10. A device according to claim 9, wherein the weighing part is provided with a vibration sensor for measuring external vibrations acting on the weighing part.

11. A device according to claim 10, wherein the vibration sensor comprises a further weighing unit.

12. A device according to claim 10, wherein the frame is provided with two girders, via the two ends of which the frame is connected to the environment, wherein the girders have a lower bending stiffness in vertical direction than in horizontal direction.

13. A device according to claim 12, wherein the bending stiffness of the girders in horizontal direction is at least two times higher than the bending stiffness of the girders in vertical direction.

14. A device according to claim 9, wherein the weighing means comprise a start sensor for detecting the arrival of a hook on the weighing part.

15. A device according to claim 14, wherein the weighing means comprise an end sensor for detecting a hook on the weighing part downstream of the start sensor.

16. A device according to claim 9, wherein the weighing means comprise a file with the tare weight of each of the hooks acting on the weighing part during passage of the respective hooks without a slaughter product being suspended therefrom.

17. A device according to claim 1, wherein the conveying element comprises a link chain with vertically oriented links and horizontally oriented links interconnected in a regular pattern, and at least one pulley means is circumferentially provided with teeth arranged in pairs, each pair comprising an upper tooth and a lower tooth disposed directly opposite each other, wherein a gap is present between the teeth of a pair of teeth, into which gap horizontally oriented links extend at least partially, and wherein vertically oriented links are provided between the four teeth associated with two adjacent pairs of teeth, which links circumferentially abut against the flanks of said four teeth.

18. A device according to claim 17, wherein the teeth are conical in shape, seen in top plan view.

19. A device according to claim 17, wherein the upper teeth have the shape of a downward-facing cone, preferably a truncated cone, seen in cross-sectional view, and/or the lower teeth have the shape of an upward-facing cone, preferably a truncated cone, seen in cross-sectional view.

20. A device according to claim 1, wherein the conveying element comprises a link chain with vertically oriented links and horizontally oriented links interconnected in a regular pattern, and wherein at least the most downstream pulley means is circumferentially provided with teeth, wherein the conveying means comprise a guide on the circumference of the most downstream pulley means for pushing the link chain in the direction of the teeth.

21. A device according to claim 1, wherein the conveying element comprises a link chain with vertically oriented links and horizontally oriented links interconnected in a regular pattern, and at least the most downstream pulley means is circumferentially provided with teeth and, between adjacent teeth, at the bottom side thereof, with guide surfaces for guiding vertically oriented links of the link chain radially inward.

22. A device according to claim 21, wherein the guide surfaces are inclined in radially inward direction.

23. A method for using a device according to claim 16, characterised by determining the gross weight acting on the weighing part with the aid of the weighing means while a hook from which a slaughter product is suspended moves along the weighing part, deducting the tare weight associated with the hook as stored in the file from the gross weight so as to obtain the net weight of the slaughter product.

24. A method according to claim 23, characterised by determining the tare weight of a number of empty hooks with the aid of the weighing means comparing the tare weights as determined with the tare weights of the hooks in question as stored in the file, and if it appears from said comparison that a similar difference occurs between the tare weights as determined and the tare weights as stored in the file, correcting the tare weights as stored in the file in accordance with said similar difference.

25. A method according to claim 23, characterised by determining the tare weight of an empty hook a number of times with the aid of the weighing means, determining the average of the tare weights as determined, comparing the average tale weight as determined with the tare weight for the hook in question as stored in the file, and if it appears from the comparison that a difference occurs between the average tare weight as determined and the tare weight as stored in the file, correcting the tare weight stored in the file in accordance with said difference.

26. A device according to claim 4, wherein the teeth of gears of a pair of gears are oriented mirror-symmetrically relative to a plane of symmetry that extends perpendicularly to the common axis of rotation.

27. A device according to claim 4, wherein the gear transmission has a s-shaped path.

* * * * *